US010563743B2

(12) United States Patent
Horen et al.

(10) Patent No.: US 10,563,743 B2
(45) Date of Patent: Feb. 18, 2020

(54) TORQUE CONVERTER LOCKUP CLUTCH STRUCTURE

(71) Applicant: ALLISON TRANSMISSION, INC., Indianapolis, IN (US)

(72) Inventors: Jezrah Horen, Fairland, IN (US); Michael Rietdorf, Indianapolis, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

(21) Appl. No.: 16/122,049

(22) Filed: Sep. 5, 2018

(65) Prior Publication Data

US 2019/0003566 A1  Jan. 3, 2019

Related U.S. Application Data

(63) Continuation of application No. 15/043,810, filed on Feb. 15, 2016, now Pat. No. 10,125,853.

(60) Provisional application No. 62/117,143, filed on Feb. 17, 2015.

(51) Int. Cl.
*F16H 45/02* (2006.01)
*F16D 13/70* (2006.01)
*F16D 25/0638* (2006.01)

(52) U.S. Cl.
CPC ............ *F16H 45/02* (2013.01); *F16D 13/70* (2013.01); *F16D 25/0638* (2013.01); *F16D 2300/22* (2013.01); *F16H 2045/021* (2013.01); *F16H 2045/0221* (2013.01); *F16H 2045/0284* (2013.01)

(58) Field of Classification Search
None
See application file for complete search history.

(56) References Cited

U.S. PATENT DOCUMENTS

| 6,050,380 | A | 4/2000 | Peinemann et al. |
| 7,975,817 | B2 | 7/2011 | Muller et al. |
| 8,042,665 | B2 | 10/2011 | Sturgin |
| 8,448,763 | B2* | 5/2013 | Zuehl .................. B21J 5/02 192/3.29 |
| 8,545,367 | B2* | 10/2013 | Hartz .................. B60K 6/40 477/5 |
| 8,919,509 | B2 | 12/2014 | Maienschein |
| 9,074,640 | B1 | 7/2015 | Wolverton |
| 9,140,346 | B2* | 9/2015 | Steinberger ............ F16H 45/00 |
| 9,297,448 | B1 | 3/2016 | Depraete et al. |
| 9,309,956 | B2* | 4/2016 | Lindemann ............ F16H 45/02 |
| 2006/0180423 | A1 | 8/2006 | Kos et al. |
| 2010/0089046 | A1 | 4/2010 | Tomiyama |

OTHER PUBLICATIONS

International Search Report and Written Opinion of the International Searching Authority; dated May 12, 2016; 14 pages.

* cited by examiner

*Primary Examiner* — Colby M Hansen
(74) *Attorney, Agent, or Firm* — Taft Stettinius & Hollister LLP; Stephen F. Rost

(57) ABSTRACT

A torque converter assembly that has a turbine assembly, a pump assembly, and a clutch assembly that selectively rotationally couples the turbine assembly to the pump assembly, the clutch assembly further having at least one clutch disk and a backing plate having at least one finger defined therefrom, the at least one finger rotationally coupled to the at least one clutch disk.

20 Claims, 12 Drawing Sheets

TORQUE CONVERTER LOCKUP CLUTCH STRUCTURE

RELATED APPLICATIONS

The present application is a continuation of U.S. patent application Ser. No. 15/043,810, filed on Feb. 15, 2016, and which claims the benefit of U.S. Provisional Application Ser. No. 62/117,143, filed on Feb. 17, 2015, the disclosures of which are hereby expressly incorporated by reference in their entirety.

FIELD OF THE DISCLOSURE

The present disclosure relates to a transmission system, and in particular to a lockup clutch assembly of a torque converter for the transmission system.

BACKGROUND

A torque converter is a fluid coupling device that is used to transfer rotating power from a power unit, such as an engine or electric motor, to a power-transferring device such as a transmission. A torque converter can have a clutch system to allow the torque converter to be selectable for either fluid coupling or mechanical coupling depending on the engagement of the clutch system. The transmission is an apparatus through which power and torque can be transmitted from a vehicle's power unit to a load-bearing device such as a drive axis. Conventional transmissions include a variety of gears, shafts, and clutches that transmit torque therethrough.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The terminology used herein is for the purpose of describing particular illustrative embodiments only and is not intended to be limiting. As used herein, the singular forms "a", "an" and "the" may be intended to include the plural forms as well, unless the context clearly indicates otherwise. Similarly, plural forms may have been used to describe particular illustrative embodiments when singular forms would be applicable as well. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
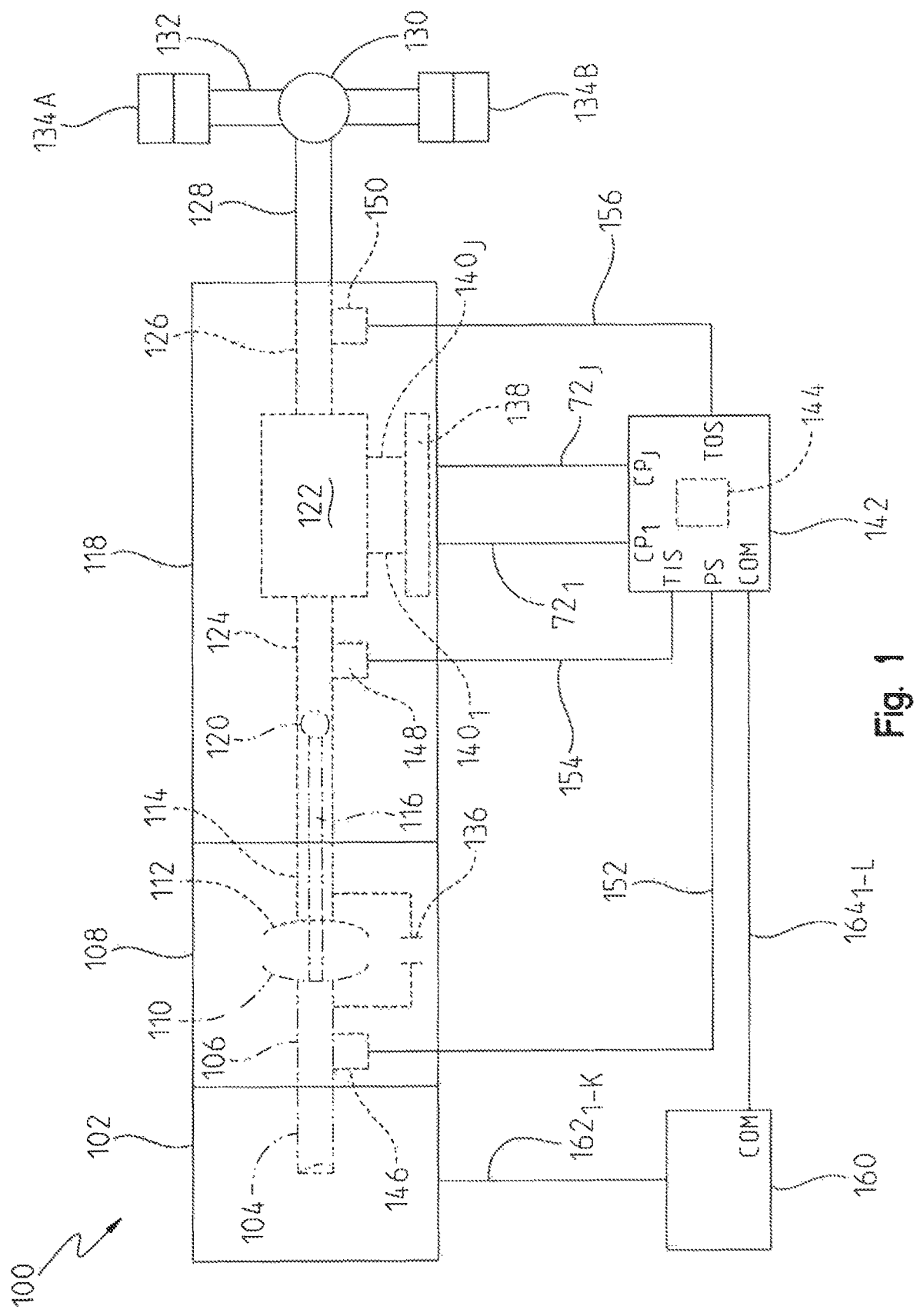
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Figure 2:
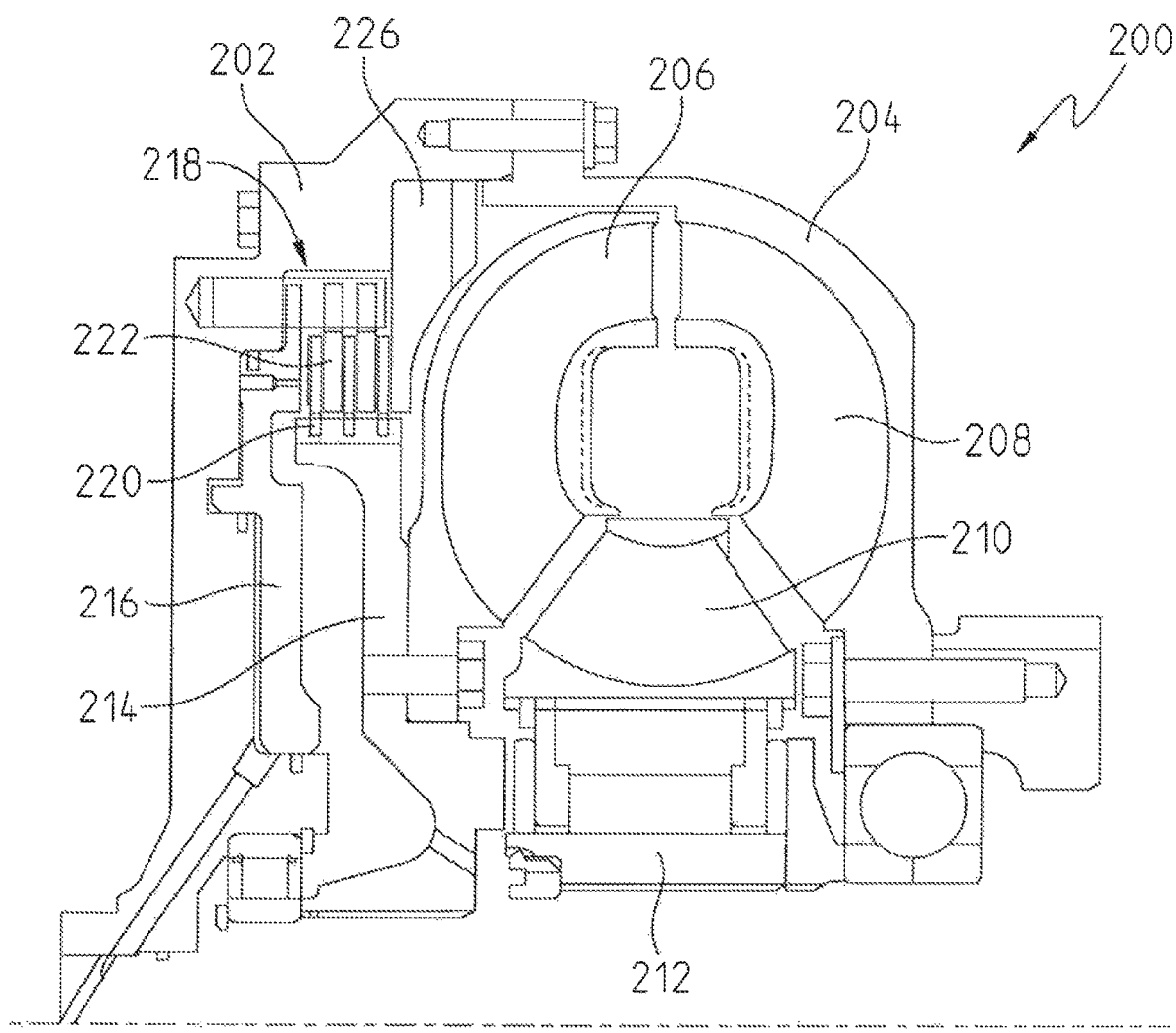
FIG. 2 is a top half cross-sectional view of a conventional torque converter.

Referring to FIG. 2, one embodiment is shown of a top half, cross-sectional view of a conventional torque converter 200. Torque converter 200 includes a front cover assembly 202 fixedly attached to a rear cover 204 or shell at a coupled location. In one example, the coupled location can include a bolted joint, a welded joint, or any other type of coupling means. The converter 200 includes a turbine assembly 206 with turbine blades, a shell, and a core ring. The converter 200 also includes a pump assembly 208 with impellor or pump blades, an outer shell, and a core ring.

A stator assembly 210 is axially disposed between the pump assembly 208 and the turbine assembly 206. The stator assembly 210 can include a housing, one or more stator blades, and a one-way clutch 212. The one-way clutch 212 may be a roller or sprag design as is commonly known in the art.

The torque converter 200 can include a clutch assembly 218 that transmits torque from the front cover 202 to a turbine hub 214. The clutch assembly 218 includes a piston plate 216, a backing plate 226, a plurality of clutch plates 220, and a plurality of reaction plates 222. The plurality of clutch plates 220 and reaction plates 222 can be splined to the turbine hub 214, which is bolted to a turbine assembly as shown in FIG. 2. The piston plate 216 can be hydraulically actuated to engage and apply the clutch assembly 218, thereby "hydraulically coupling" the turbine assembly 206 and pump assembly 208 to one another. Hydraulic fluid can flow through a dedicated flow passage in the torque converter 200 on a front side of the piston plate 216 to urge the plate 216 towards and into engagement with the clutch assembly 218. One skilled in the art can appreciate how this and other designs of fluid-coupling devices can be used for fluidly coupling an engine and transmission to one another.

Figure 3:
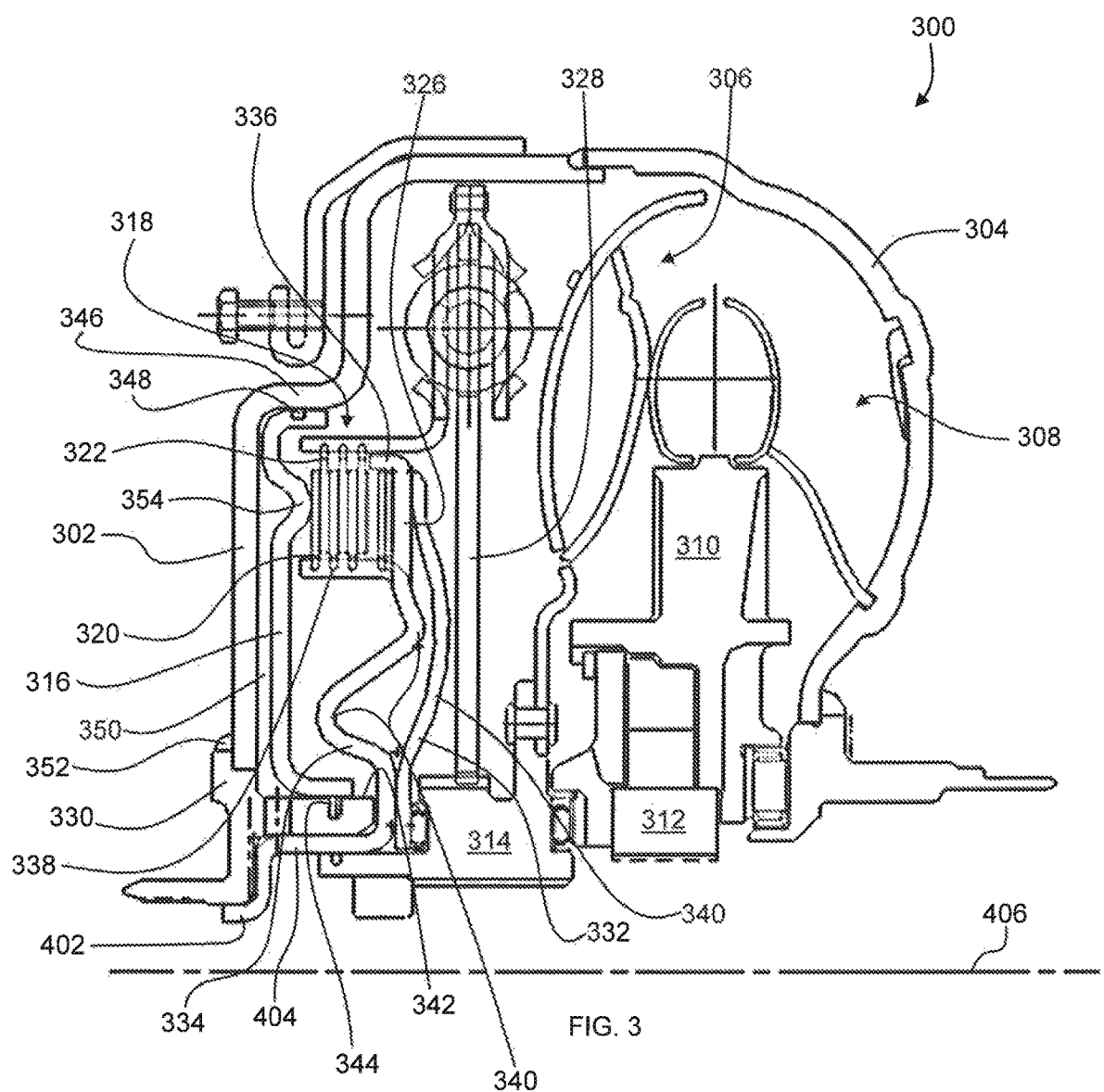
FIG. 3 is a top half cross-sectional view of a torque converter as disclosed herein.

Referring now to FIG. 3, an embodiment is shown of a top half, cross-sectional view of a torque converter 300. Torque converter 300 includes a front cover 302 coupled to a rear cover 304 or shell at a coupling location. In one example, the coupled location can include a bolted joint, a welded joint, or any other type of coupling means. The torque converter 300 includes a turbine assembly 306 having turbine blades, a shell, and a core ring. The torque converter 300 also includes a pump assembly 308 with impellor or pump blades, an outer shell, and a core ring.

A stator assembly 310 may be axially disposed between the pump assembly 308 and the turbine assembly 306. The stator assembly 310 can include a housing, one or more stator blades, and a one-way clutch 312. The one-way clutch 312 may be a roller or sprag design as is commonly known in the art.

The torque converter 300 can include a clutch assembly 318 that transmits torque from the front cover 302 to a turbine hub 314. The turbine hub 314 may further be splined or otherwise coupled to a turbine shaft of a transmission (not shown). The clutch assembly 318 may include a piston 316 disposed within a cavity created by the front cover 302. The piston 316 may have a radial protrusion 354 that is defined radially about the piston 316 and protrudes partially towards the rear cover 304. At least one clutch plate 320 and at least one reaction plate 322 may also be disposed within the cavity. The clutch plate 320 and the reaction plate 322 may be radially disposed to axially adjacent to the protrusion 354 of the piston 316. Additionally a backing plate 326 may also be disposed within the cavity created by the front cover 302 at a location that permits the backing plate 326 to be substantially adjacent to the clutch plate 320 and/or the reaction plate 322.

The clutch assembly 318 may be coupled to the turbine hub 314 through a damper 328. The damper 328 may provide for damping torque variations experienced between the front cover 302 and the turbine hub 314 as is known in the art. One of ordinary skill in the art may be familiar with the plurality ways the torque load distribution in a torque converter can be damped, and this disclosure is not be limited to any one type of damper. For example, a coil spring may be used to rotationally couple two components to one another. When a torsional load is distributed from one component to the other, the spring may provide a damped transmission of the torsional load. Additionally, any other type of damping system can be used. Damping systems such as hydraulic shock absorbers, gas springs, clutch assemblies, and the like are considered and this disclosure is not limited to any particular type of damper.

The piston 316 can be hydraulically actuated to engage and apply the clutch assembly 318, thereby mechanically coupling the turbine assembly 306 and front cover 302 to one another. Fluid can flow through a dedicated flow passage in the torque converter 300 on a front side of the piston 316 to urge the piston 316 towards, and into engagement with, the clutch assembly 318. One skilled in the art can appreciate how this and other designs of clutch assemblies can be used for mechanically coupling two rotating components to one another.

One embodiment where the backing plate 326 can be supported by a first member 332 and a second member 334 is shown in FIG. 3. The first member 332 and the second member 334 can be used to transfer torsional loads from the front cover 302 to the turbine hub 314 when the clutch assembly 318 is in the engaged position. In one nonlimiting example, when the clutch is engaged, the torque applied to the front cover 302 may be transferred into the nose hub 330. The nose hub 330 may be fixedly coupled to the first and second member 332, 334 and transfer the applied torque through the clutch assembly 318, down the damper 328, and into the turbine hub 314.

More specifically, the first member 332 may be coupled to the backing plate 326 at a radially outer location of the backing plate 326, while the second member 334 may be coupled to the backing plate 326 at a radially inner location of the backing plate 326. Alternatively, the backing plate 326 may be a continuation of, or integrally formed with, the second member 334.

The first member 332 may be substantially annular in shape with a central hole or bore therethrough. Further, the first member 332 may have an arc-shaped cross section as shown in FIG. 3. The arc-shaped cross section may be coupled at one end to the backing plate 326 and coupled at the other end to the second member 334.

The second member 334 may also be annular and be formed with a plurality of bends when viewed in the cross section of FIG. 3. The second member 334 may form the backing plate 326 and terminate at a backing plate lip 336. The second member 334 may also have at least one finger 338 that may engage the splines of the clutch plate 320 or reaction plate 322.

Figure 12:
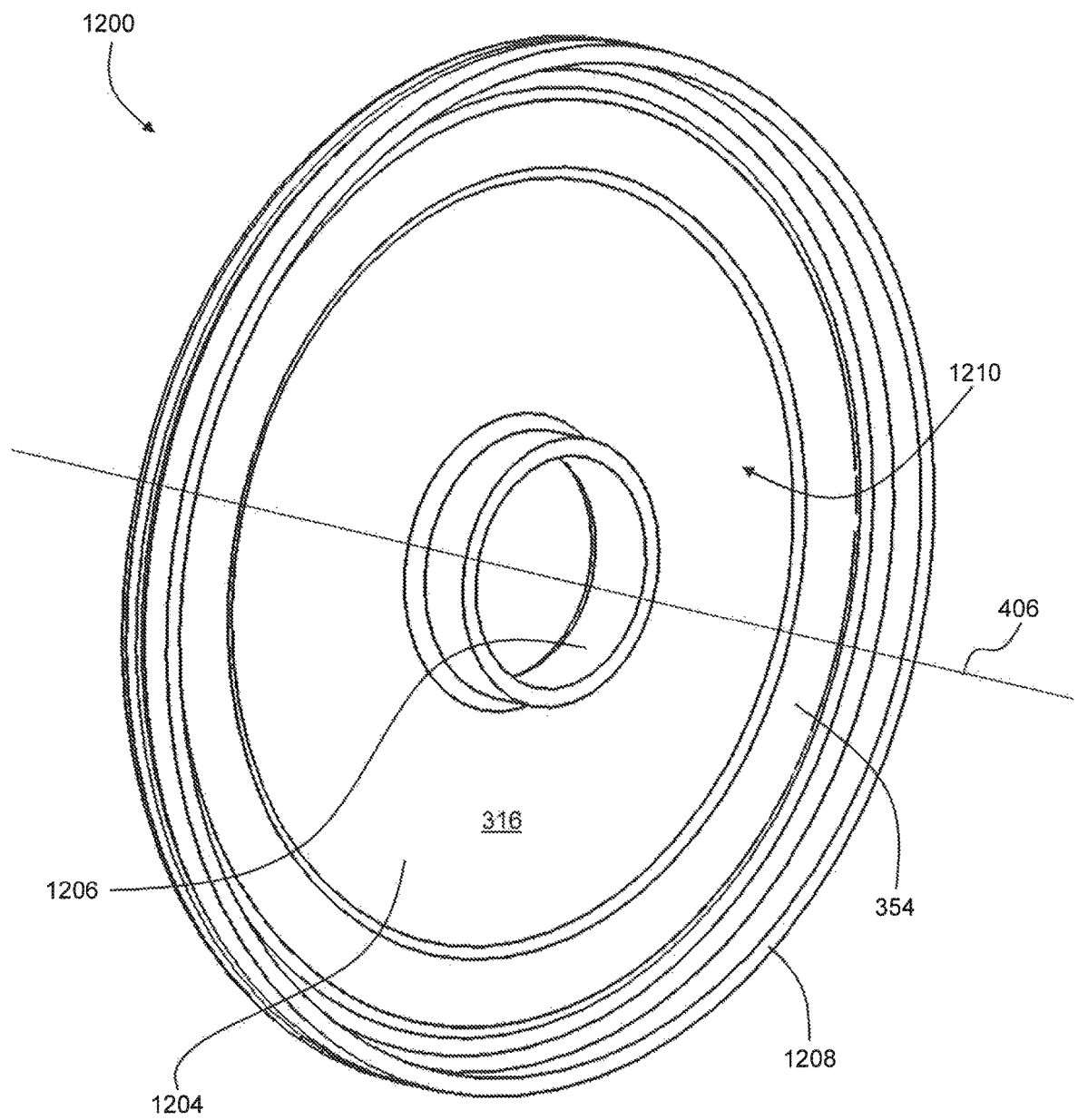
FIG. 12 is a perspective view of a piston plate of the torque converter of FIG. 3.

Now referring to FIG. 12, an isolated view of a piston 1200 is shown. In one embodiment of the present disclosure, the piston 316 may be located partially along one end of the clutch assembly 318 as shown in FIG. 3. The piston 316 may have a protrusion 354 that is defined radially in the piston 316. The protrusion 354 may also align at least partially with the clutch assembly 318. The protrusion 354 can extend sufficiently away from a planar surface 1210 of a piston plate 1204 so a portion of the protrusion 354 will contact the clutch assembly 318 when the piston 316 is disposed in the engaged position.

The piston 316 may have an inner sleeve 1206 and an outer sleeve 1208. The inner sleeve 1206 may have an inner radius that is slightly greater than an outer radius of an internal portion 342 of a nose hub 330 as shown in FIG. 3. The radius of the inner sleeve 1206 may be sufficiently large to allow the piston 316 to slide axially along the internal portion 342 of the nose hub 330 while simultaneously being able to substantially restrict fluid from passing between the inner sleeve 1206 and the nose hub 330. To further limit fluid transfer through the inner sleeve 1206, a first seal 344 may be located between the inner sleeve 1206 and the internal portion 342 of the nose hub 330.

The outer sleeve 1208 may have an outer radius that is slightly less than an inner portion 346 of the front cover 302 as shown in FIG. 3. The outer radius of the outer sleeve 1208 may be adequately sized to allow the piston 316 to slide axially along the inner portion 346 of the front cover 302 while simultaneously being tight enough to substantially restrict fluid from passing between the inner portion of the front cover 302 and the outer sleeve 1208. To further limit fluid transfer through the outer sleeve 1208, a second seal 348 may be located between the outer sleeve 1208 and the inner portion 346 of the front cover 302.

The inner sleeve 1206 and the outer sleeve 1208 may be configured to allow the piston 316 to move both axially and radially about a first or rotation axis 406. The axial movement of the piston 316 may be controlled by filling a piston plate cavity 350 with a pressurized fluid (not shown) via one or more of the fluid paths $140_1$-$140_j$. As the piston plate cavity 350 is filled with fluid, the piston 316 may move axially away from the front cover 302. As the piston 316 is forced away from the front cover 302, the protrusion 354 in the piston 316 may contact the clutch assembly 318. In turn, the clutch plate 320 and the reaction plate 322 may be forced into contact with one another sufficiently to transfer torsional loads between the front cover 302 and the turbine hub 314. Further, when pressurized fluid is no longer supplied to the piston plate cavity 350, the protrusion 354 may no longer provide sufficient axial force to the clutch assembly 318 to provide mechanical coupling between the front cover 302 and the turbine hub 314 through the clutch assembly 318.

In one embodiment, the piston 316 is not required to transfer any torque to the clutch assembly 318. In this embodiment, the first and second seal 344, 348 may allow sufficient frictional properties between the piston 316, the front cover 302, and the nose hub 330 to rotate the piston 316 as the front cover rotates 316. In a different embodiment, the frictional properties of the first and second seal 344, 348 may allow the piston 316 to rotate independently of the front cover 302. In yet another embodiment, the piston 316 may be radially coupled to either the front cover 302 or the nose hub 330, or both, so that the piston 316 rotates as the front cover 302 rotates.

When the clutch assembly 318 is in the engaged or "lockup" position, the backing plate 326 may adequately counteract the axial force from the piston 316 to keep the backing plate 326 from substantially deflecting towards the rear cover 304.

Figure 4:
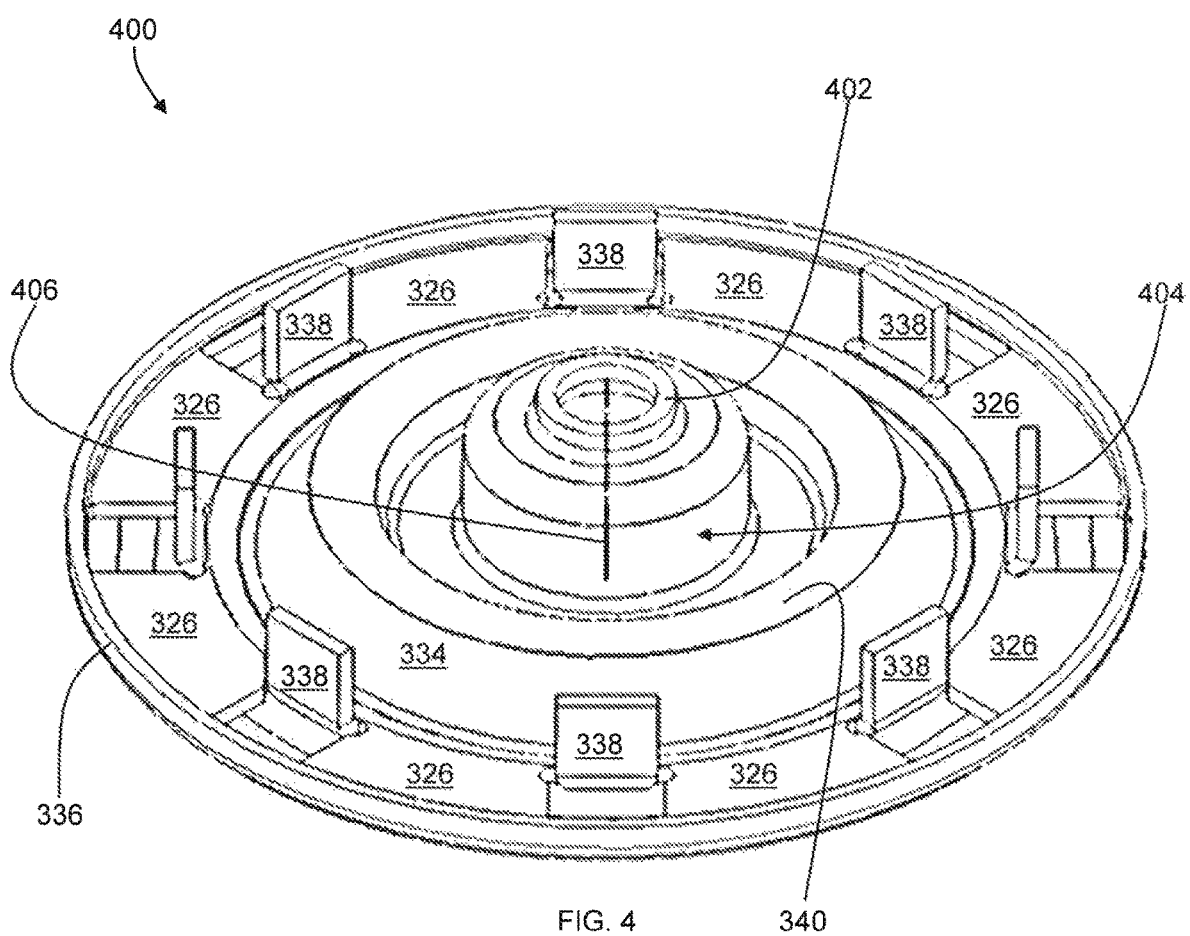
FIG. 4 is an elevated perspective view of a backing plate with a radial lip as disclosed herein.

Now referring to FIG. 4, one embodiment of a backing plate assembly 400 is shown. The backing plate assembly 400 may be radially defined about the first axis 406. The backing plate assembly 400 can have the lip 336, backing plate 326, finger 338, and second member 334 shown in FIG. 3. The second member 334 may include at least one bend 340 radially formed about the first axis 406 to increase the rigidity of the backing plate assembly 400. Further, the backing plate 326 may be substantially the same piece of material as the second member 334. More specifically, as the second member 334 extends radially away from the first axis 406, it may define the backing plate 326 by creating a substantially planar radial surface that is perpendicular to the first axis 406.

Additionally, the finger 338 may be formed from a partially cutout portion of the backing plate 326. More specifically, the finger 338 may be a cutout of a portion of the backing plate 326 that is bent towards the front cover 302 at a radial distance from the first axis 406 to create a substantially 90 degree bend from the surface of the backing plate 326.

The second member 334 may have a lip 402 defined at a first end thereof about the radially innermost portion of the backing plate assembly 400. The lip 402 may partially define a passage capable of allowing a shaft to pass therethrough. The backing plate assembly 400 may extend radially outward from the lip 402 to form a hub portion 404. The hub portion 404 may be radially defined about the first axis 406 to correspond with the interior dimensions of the nose hub 330 (FIG. 3). The hub portion 404 can be dimensioned to be received by a cavity created by the nose hub 330. Further, the nose hub 330 can be disposed to substantially encompass the lip 402 and the remaining hub portion 404 of the backing plate assembly 400 as shown in FIG. 3.

In one embodiment, the nose hub 330 can be used to couple the front cover 302 to the second member 334. The nose hub 330 may be coupled to the front cover 302 at a coupling point 352 in a manner that is sufficient to transfer the torsional loads from the front cover to the nose hub 330. In one embodiment, the front cover 302 may be welded to the nose hub 330 at the coupling point 352 but this disclosure is not limited to such a coupling method. One skilled in the art will understand how other coupling methods may be utilized to achieve similar results. Such methods as fasteners, adhesives, splines, threads, press fittings, and the like may be used to couple the nose hub 330 and the front cover 302 to one another.

The nose hub 330 may also be coupled to the backing plate assembly 400. The backing plate assembly 400 may be press fit or otherwise disposed within the cavity created by the nose hub 330. Additionally, the backing plate assembly 400 may also be coupled to the nose hub 330 utilizing one or more of the plurality of coupling methods described above. Once the torque converter 300 is fully assembled, torsional inputs into the front cover 302 may be distributed to the backing plate assembly 400 through the nose hub 330.

Further, the backing plate assembly 400 can terminate at the backing plate lip 336 located at the radially outermost portion of the second member 334. The backing plate lip 336 may be defined circumferentially about the outermost diameter or edge of the second member 334. In addition, the lip 336 may be substantially perpendicular to the surface of the backing plate 326. By terminating the backing plate 326 at the backing plate lip 336, the stiffness of the backing plate assembly 400 may be improved. While one embodiment may utilize the backing plate lip 336 that is perpendicular to the backing plate 326, this disclosure is not intended to be limited to such an orientation. One skilled in the art will understand how a plurality of different degree bends may also be utilized to achieve substantially the same result.

Figure 5:
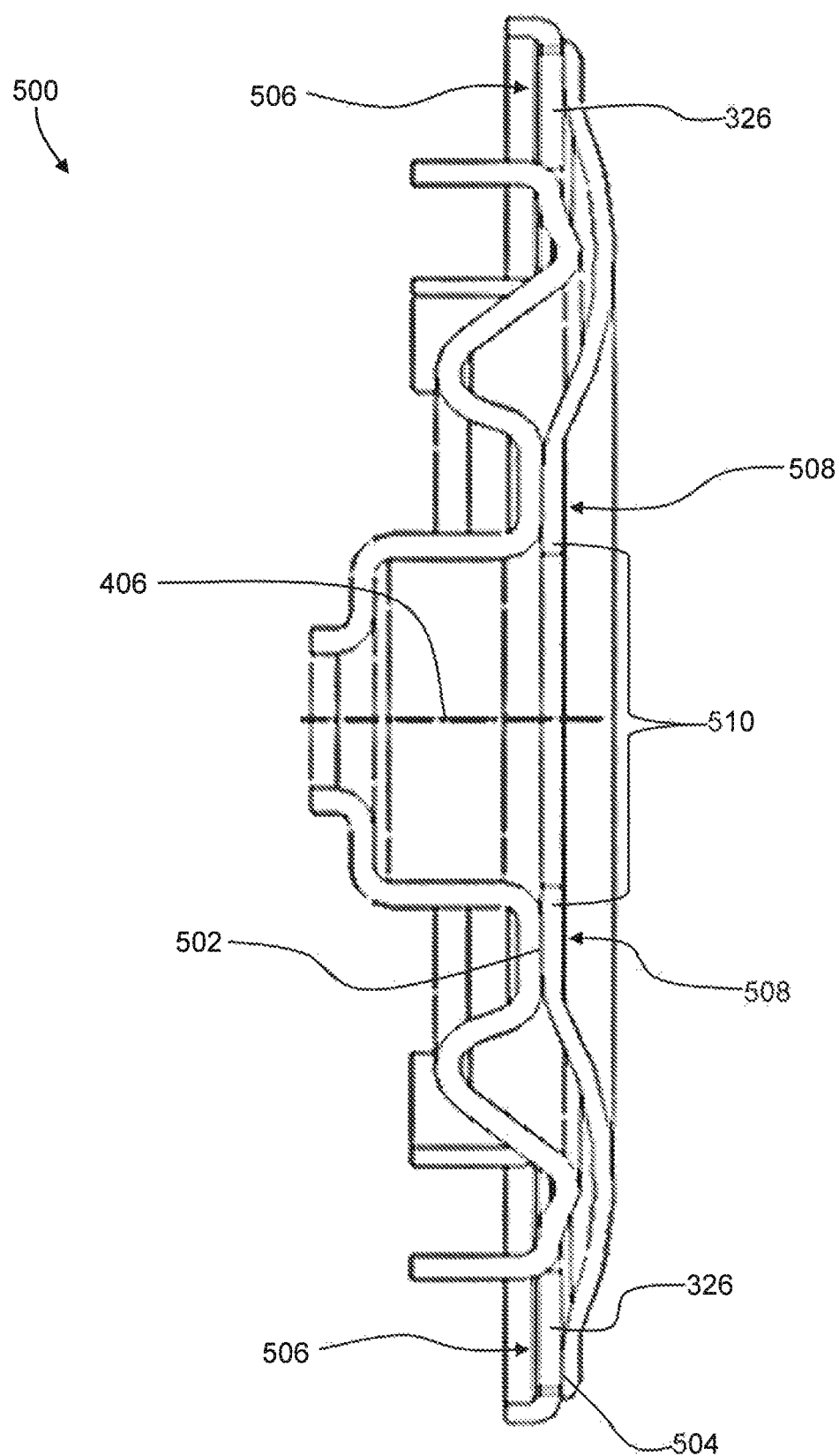
FIG. 5 is a cross sectional view of the backing plate of FIG. 4.

A cutaway view 500 of the backing plate assembly 400 is shown in FIG. 5. More specifically, a first and second location 502, 504 are shown as one non-limiting example of where the first member 332 may couple to the second member 334. The first location 502 may be a radially inner portion of the first member 332 that is substantially adjacent with a portion of the second member 334. The second location 504 may be a radially outer portion of the first member 332 that is substantially adjacent with a portion of the second member 334. The first member 332 and the second member 334 can be coupled to one another in a plurality of ways such as welds, bolts, rivets, chemical bonding agents or the like. In one non-limiting aspect, the first location 502 and the second location 504 may substantially affix the first member 332 and the second member 334 to one another. In another aspect, the two members may not be fixed to one another.

The backing plate 326 may experience axial forces about the first axis 406 when the piston 316 engages the clutch assembly 318 as described above. By coupling the first member 332 to the second member 334 at the first and second locations 502, 504, the rigidity of the backing plate assembly 400 may be enhanced. More specifically, as the piston 316 applies the axial force to the backing plate 326, the first member 332 may substantially inhibit any axial movement of the backing plate 326 by being coupled to the second member 334 at both the first and second location 502, 504.

When an axial force 506 (FIG. 5) is applied by the piston 316, the backing plate 326 may resist axial movement by transferring a resistive force 508 through the backing plate assembly 400 to the turbine hub 314. Further, because the backing plate assembly 400 may resist axial movement at a radially inner portion 510, it may be more susceptible to axial deflection about the radially outermost portion of the backing plate 326. In one embodiment, the second location 504 may be a radially outermost portion of the backing plate 326 to substantially resist axial deflection about the backing plate 326. By coupling the first member 332 to the second member 334 at such a second location 504, the backing plate 326 may substantially resist deflection under the axial force 506 created by the piston 316.

Referring back to FIG. 4, the finger 338 is also more clearly shown. The finger 338 may be formed during the manufacturing process for the second member 334. A plurality of fingers 338 may be spaced radially equidistant from one another to allow the engagement between each finger 338 and the reaction plate 322 or the clutch plate 320. Each finger 338 can be sufficiently strong to transfer any radial forces from the input shaft 106 of the torque converter 108 through the damper 328 and into the turbine shaft 114 when the clutch assembly 318 is in the engaged position.

While one embodiment of the disclosure may have the plurality of fingers 338 equidistantly spaced from one another, one skilled in the art will understand how a plurality of offset distances may be used as well to achieve substantially the same result. Further, the number of fingers and the width of each finger may vary greatly depending on the particular load being transferred by each finger. As is known in the art, the particular design of the plurality of fingers 338 can be varied to accommodate the various loads that may need to be transferred therethrough.

The embodiment shown in FIGS. 4 and 5 may be manufactured utilizing a stamping/punching process and a welding process. The first step of the manufacturing process may be stamping or punching the first member 332 out of a sheet of material. The sheet can be any desired material composition or otherwise and may be the appropriate thickness to resist substantial deformation. The stamping or punching process can take place either simultaneously or in different steps.

If the stamping or punching process is done in different steps, the needed material for the first member 332 can be punched out of the supplied material to create a blank. The blank can have the desired dimensions to correlate with the stamping process to create the desired final backing plate assembly 400 dimensions. In one non-limiting example, the blank for the first member 332 may have a diameter larger than the final diameter of the first member 332. During the stamping process, the blank for the first member 332 may be formed into the desired final shape by pressing the blank between a die. The die may form the bend 340 into the first member 332. Similarly to the above process described for the first member 332, the second member 334 may undergo a punching or stamping process to achieve a desired final result.

After the first member 332 and the second member 334 have been formed, it may be necessary to couple the two pieces to one another to create an adequately strong backing plate assembly 400. One method of coupling the first member 332 and the second member 334 to one another may include welding the two components to one another. A weld or welds may be located at both the first location 502 and the second location 504. The weld or welds may be continuous throughout the first location 502 and the second location 504 of the first member 332. The weld or welds may also be segmented throughout the first location 502 and the second location 504 of the first member 332.

While methods for using a press have been described herein as a way to form the components of the backing plate assembly 400, this disclosure is not limited to any particular manufacturing method. One skilled in the art will understand how a laser, waterjet, CNC mill, plasma cutter, and/or the like may be used to cut a material into a desired blank. Further, while a press and a die have been described as one way to create the desired shape of the backing plate assembly 400, other methods such as molding, machining, 3-D printing, additive manufacturing, casting or any other similar manufacturing process may be used.

While welding has been described as one method for coupling the first member 332 to the second member 334 other coupling methods may be used. More specifically, the two plates may be bolted, riveted, press fit, or otherwise coupled to one another and no single coupling method should be seen as limiting.

Figure 6:
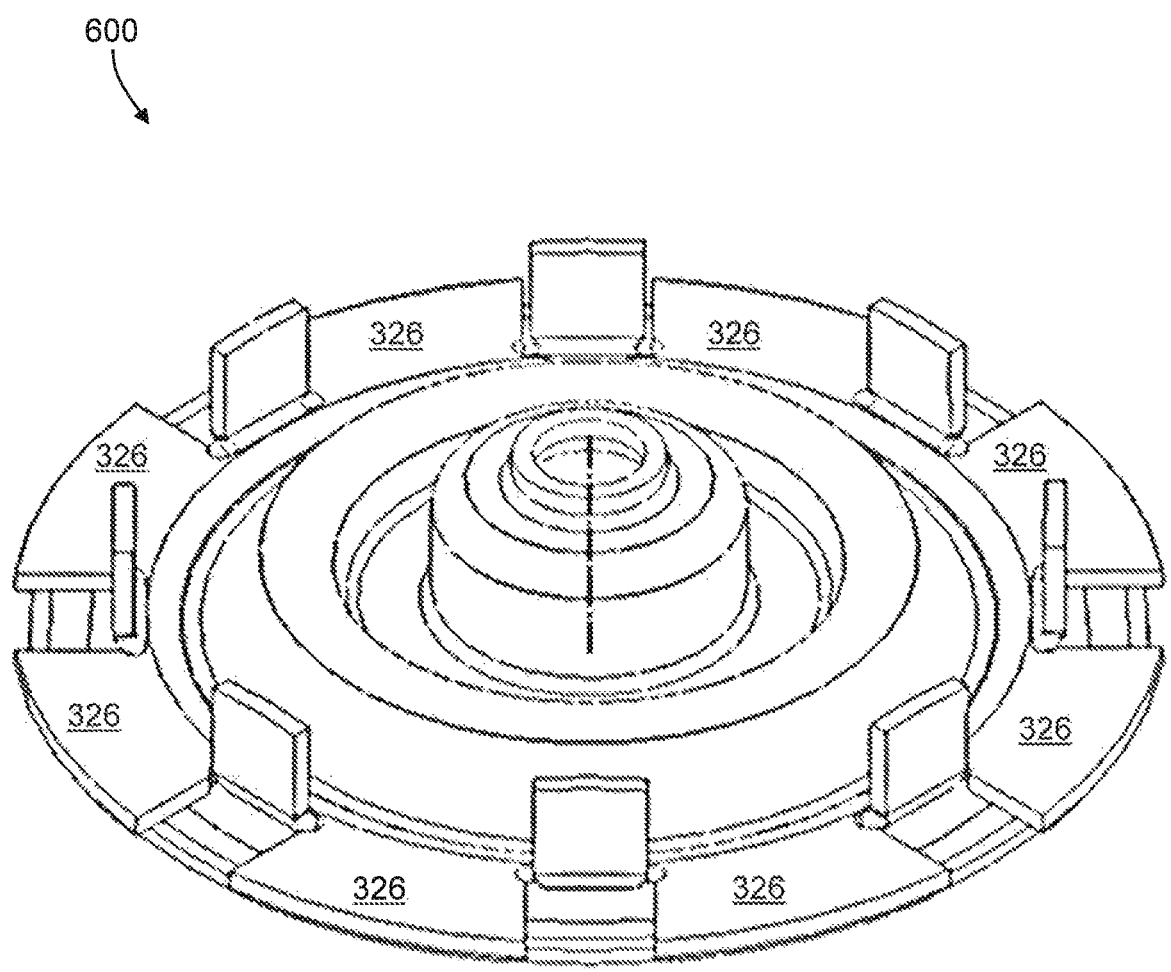
FIG. 6 is an elevated perspective view of a backing plate without a radial lip as disclosed herein.
Figure 7:
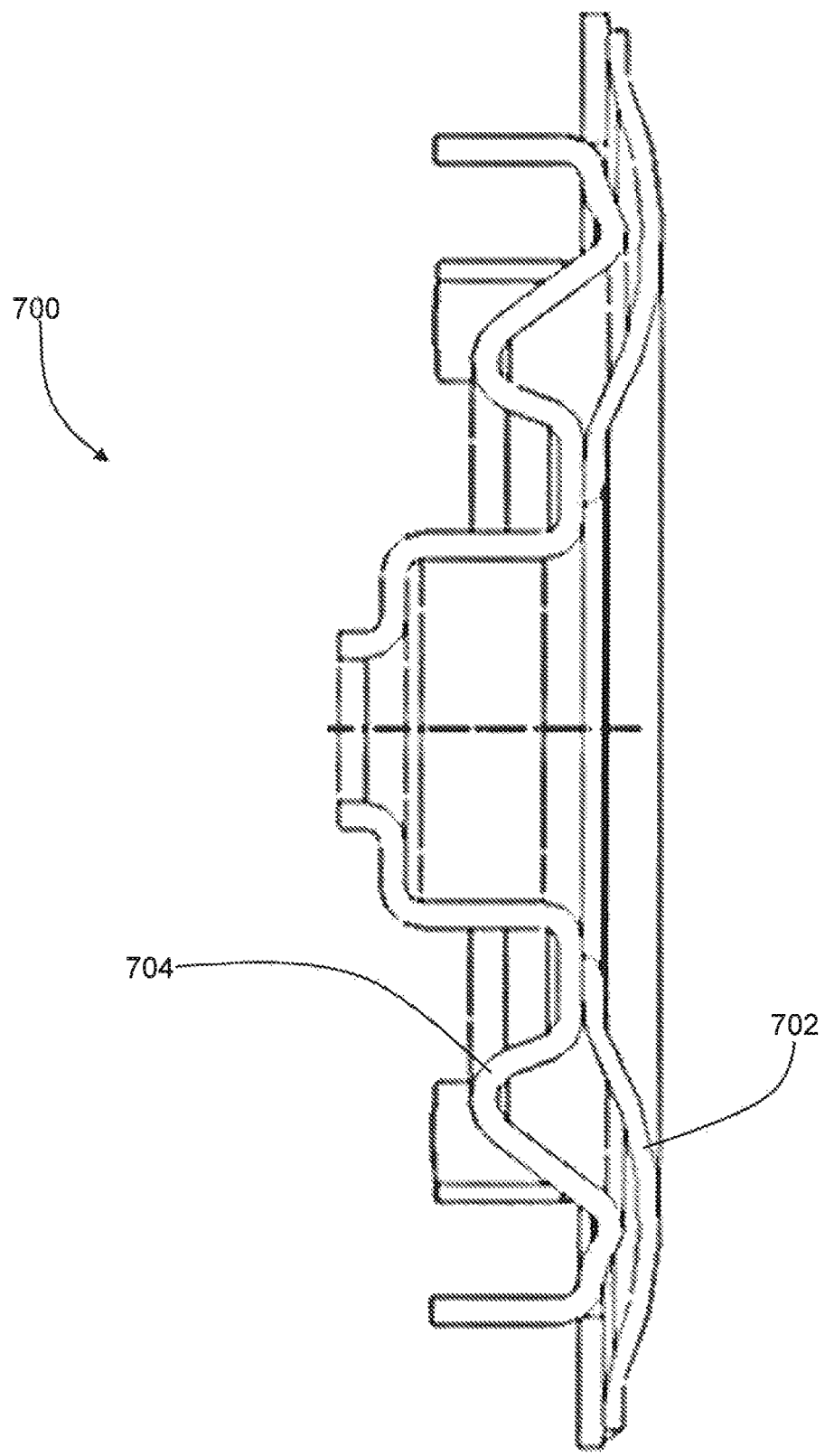
FIG. 7 is a cross sectional view of the backing plate of FIG. 6.

Another embodiment of the backing plate assembly 600 absent a lip is shown in FIGS. 6 and 7. In this embodiment, the backing plate 326 may terminate at a radial end that is planar with the surface of the backing plate 326. A cross-section view 700 of the backing plate assembly 600 is shown in FIG. 7. Similar to the embodiment shown in FIG. 4, this embodiment may also have a first member 702 and a second member 704. The first member 702 and the second member 704 may be substantially similar in shape to the first backing plate 334 and the second backing plate 336, respectively, with the exception of the removed backing plate lip 336.

In one embodiment, it may be advantageous to have the backing plate 326 terminate in a way that is planar to the backing plate 326 surface. The embodiment shown in FIGS. 6 and 7 may allow for the backing plate 326 to be compatible with clutch assemblies of various dimensions. For example, in the backing plate assembly 400 of FIG. 4, the clutch assembly 318 may need to be designed to fit within the backing plate 326 as defined by the backing plate lip 336. In FIGS. 6 and 7, however, the backing plate is not bound along an external edge of the backing plate 326.

Figure 8:
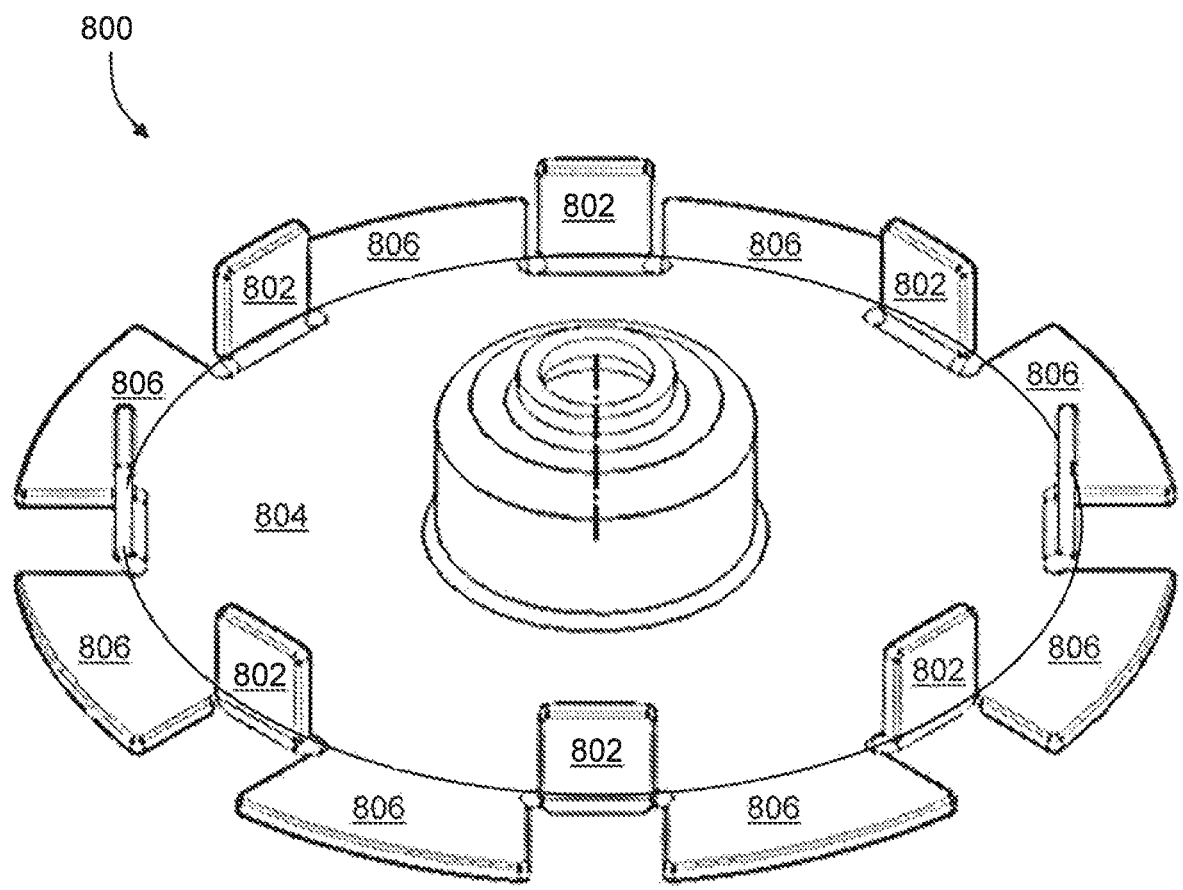
FIG. 8 is an elevated perspective view of a single piece backing plate as disclosed herein.
Figure 9:
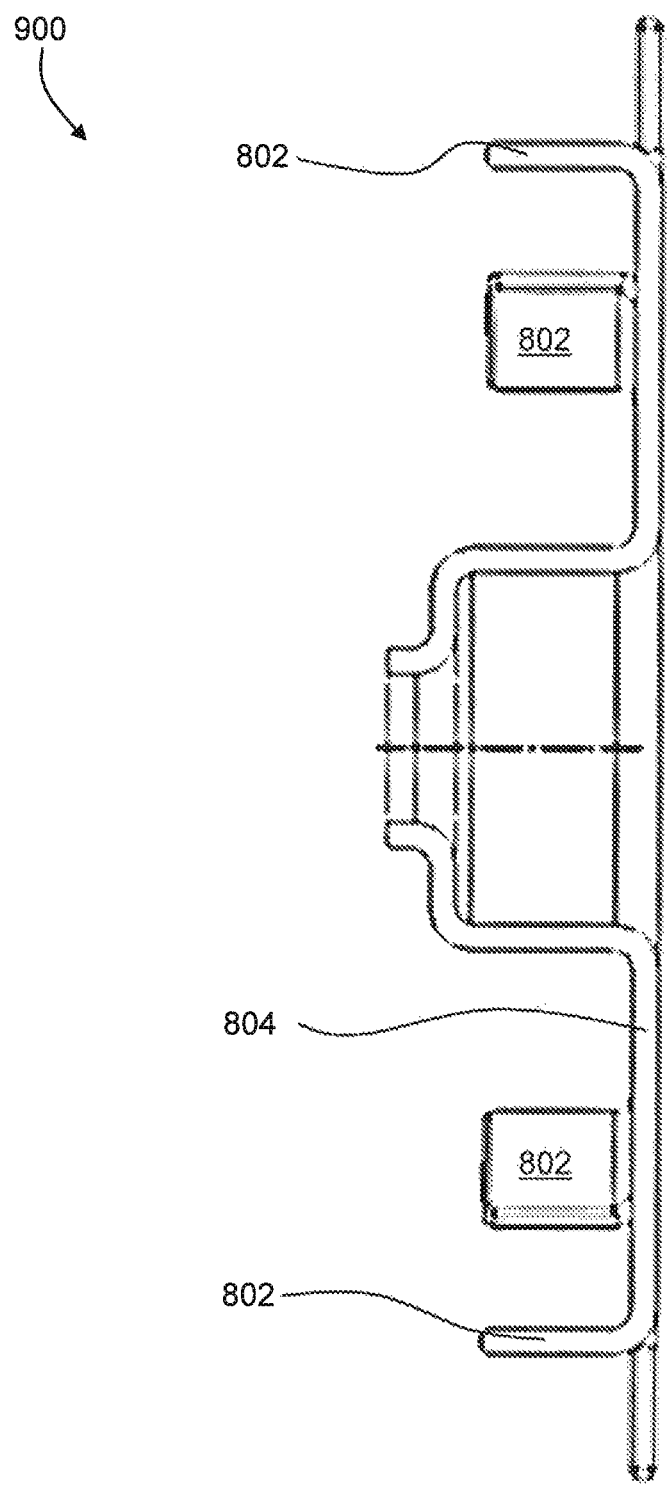
FIG. 9 is a cross sectional view of the backing plate of FIG. 8.

A different embodiment may have a single piece backing plate assembly 800, as shown in FIGS. 8 and 9, instead of having a plurality of pieces coupled together to form the backing plate assembly. The backing plate assembly 800 may have at least one finger 802 that may extend at least partially outward from a planar surface 804 of the backing plate 800. The finger 802 may be aligned along a radius that defines an inner radial edge of a backing plate 806.

A cutaway view 900 of the backing plate assembly 800 is shown in FIG. 9. The finger 802 may be formed as a substantially perpendicular bend from the planar surface 804 of the backing plate assembly 800. More specifically, the finger 802 can be formed by cutting a partial profile of the finger 802 out of the backing plate 806 prior to making the substantially perpendicular bend.

One aspect of the embodiment shown in FIGS. 8 and 9 is that it may only require one manufacturing step. For example, a stamping process may form the single piece backing plate 800 in one step. One example of manufacturing the embodiment shown in FIGS. 8 and 9 is first supplying a sheet of material having a desired thickness to a press. The press may then form the features of the single piece backing plate 800 by pressing the material into a die. A punching process may simultaneously be executed that can separate the single piece backing plate 800 from the excess material. The pressing step and the punching step may be performed either simultaneously or in any order, and this disclosure is not limited to any one method or particular order.

One advantage of the embodiment shown in FIGS. 8 and 9 is that the single piece backing plate 800 may be complete after the stamping or punching process. More specifically, the single piece backing plate 800 may be completed without welding or otherwise coupling multiple pieces to one another to form the backing plate 800. Thus, the process is relatively simple and parts can be easily mass produced.

Figure 10:
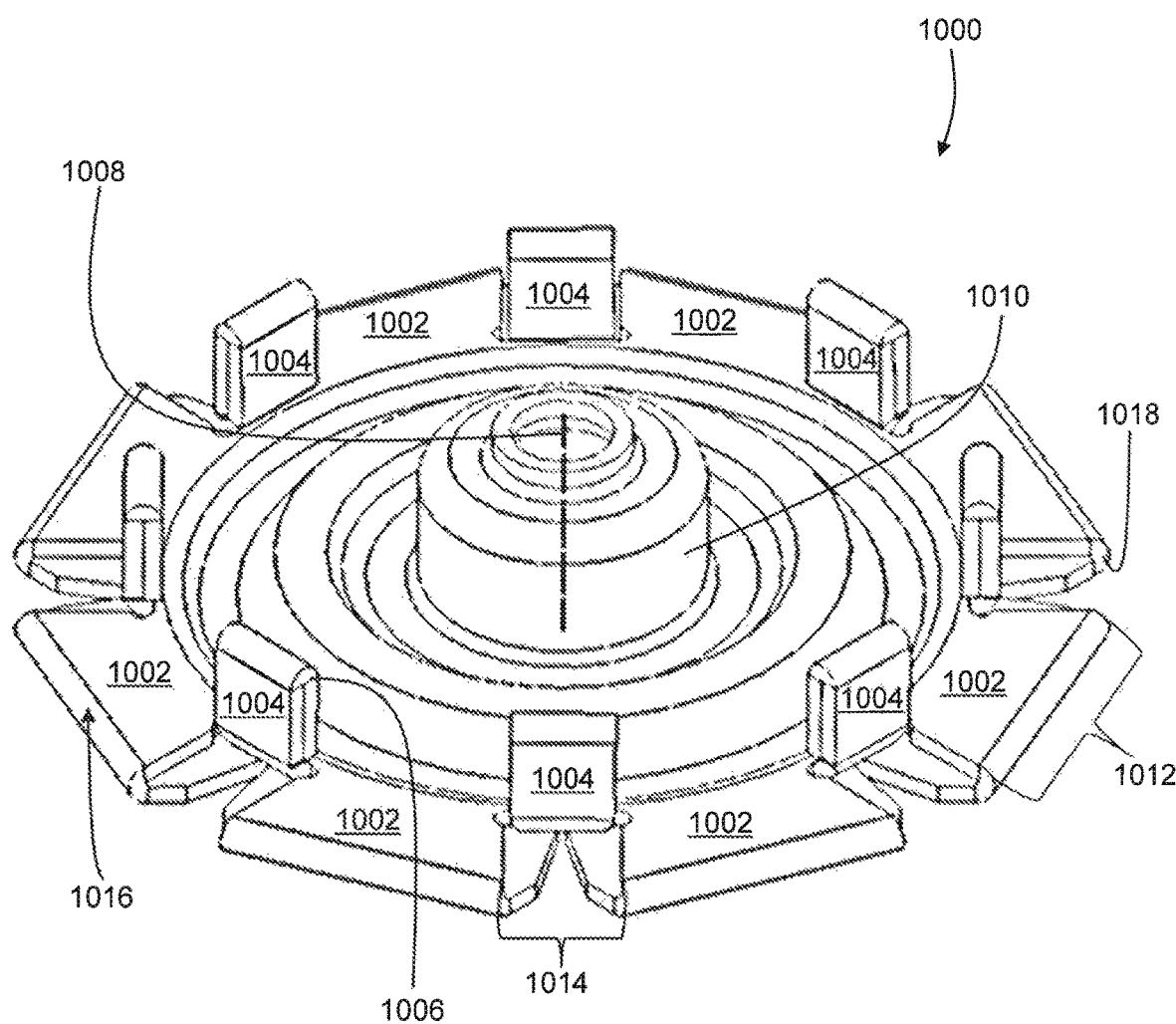
FIG. 10 is an elevated perspective view of a single piece bent backing plate assembly as disclosed herein.
Figure 11:
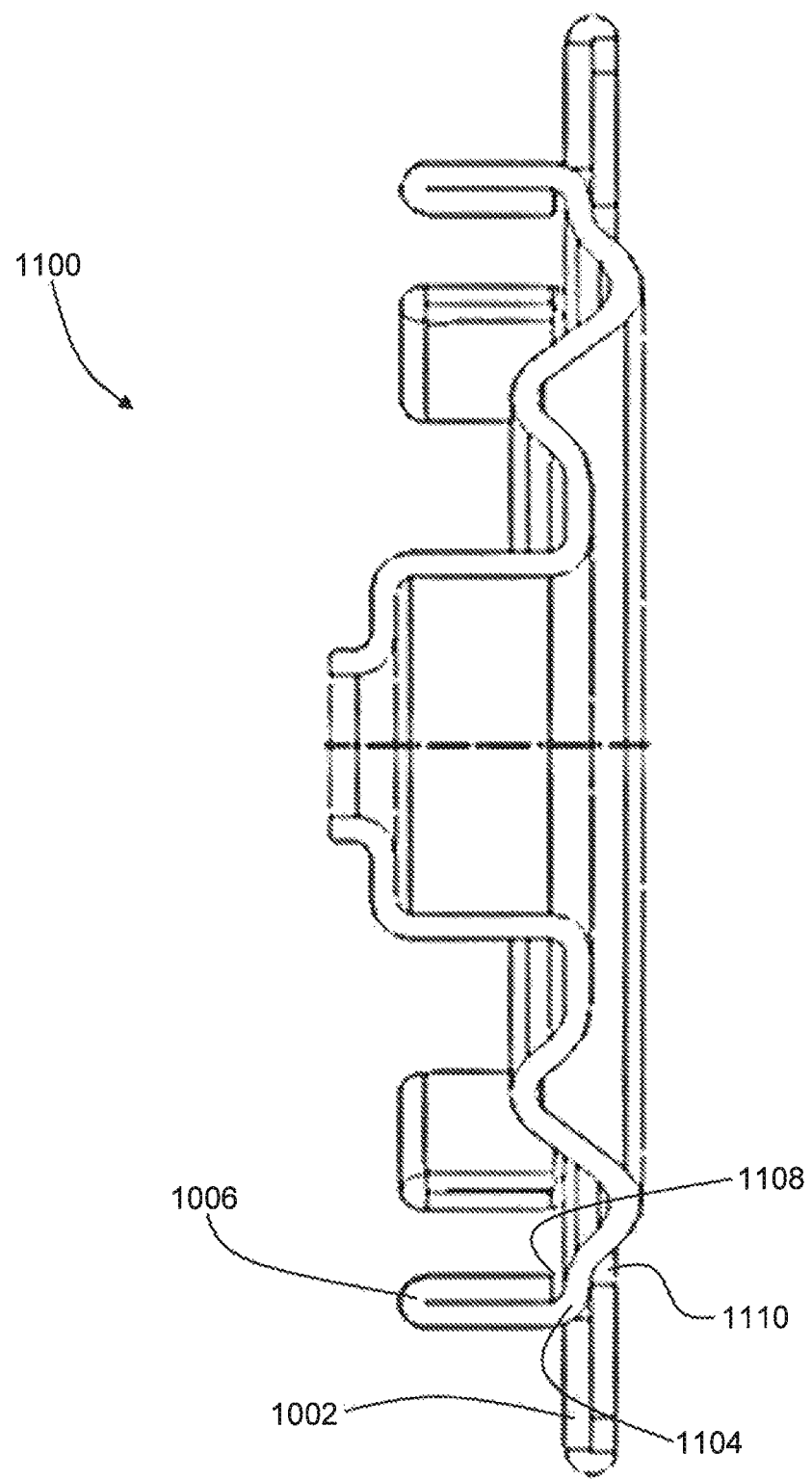
FIG. 11 is a cross section view of the backing plate of FIG. 10.

Yet another embodiment of the present disclosure is shown in FIGS. 10 and 11. Another backing plate assembly 1000 is shown in FIG. 10 that is made of substantially one piece. The backing plate assembly 1000 may include many of the features previously described such as a backing plate 1002, at least one finger 1004, at least one bend 1006, a shaft passage or bore 1008, and a hub portion 1010. The backing plate assembly 1000 can function in substantially the same way as previous embodiments.

As illustrated by the cutaway portion 1100 shown in FIG. 11, the backing plate assembly 1000 can be formed of one piece of material. The material can include a series of bends and cuts to allow it to be formed into the backing plate assembly 1000 shown in FIG. 10. The backing plate 1002 may be formed by a 180 degree bend 1018 at the outermost portion of the backing plate assembly 1000. There may be an approximately 180 degree bend 1018 at a radially outermost section of each of a plurality of backing plate sections 1012. Each section 1012 may define a portion of the backing plate 1002 where the material of the backing plate assembly 1000 is folded under the backing plate 1002 surface to create a twofold layer of material. The backing plate sections 1012 may be defined partially by at least one cutout 1014 in the backing plate material. Additional cutouts 1014 may be spaced radially around the backing plate assembly 1000.

The backing plate sections 1012 may terminate about a radially outermost edge to create substantially straight exterior edges 1016 of the backing plate assembly 1000. The straight exterior edges 1016 may be angularly offset from one another so that they combine to create a substantially 360 degree sum. For example, there may be eight sections 1012 that create a substantially octagonal circumference with their eight straight exterior edges 1016.

A portion of the cutout 1014 may be utilized to form the finger 1004. Additionally, in one embodiment the finger 1004 may be formed by a substantially 90 degree bend 1104 of the backing plate 1002. Further, the bend 1006 in the finger 1004 may be a 180 degree bend at the distal portion of the finger 1004 from the backing plate 1002. The bend 1006 may terminate at a base 1108 of the finger 1004. As a result of the 180 degree bend, the finger 1004 may be comprised of a twofold layer of the backing plate assembly 1000 material.

In one embodiment of the finger 1004, a weld may be created along the base 1108 of the finger 1004. The weld may add sufficient rigidity to the finger 1004 to allow the backing plate assembly 1000 to adequately transfer torsional loads from the clutch assembly 318 to the nose hub 330. Additionally, a weld may be created along the sides of the finger 1004 to further couple the two layers to one another. This too may be utilized to increase the load bearing capacity of the finger 1004.

In yet another embodiment of the present disclosure, the backing plate 1002 may also include a weld or other means to increase the stiffness of the backing plate assembly 1000. The weld may be located along a backing plate edge terminus 1110. By locating the weld along the terminus 1110, the rigidity of the backing plate 1002 can be increased by both the added reinforcement of the weld and by additional layers of the backing plate material in parallel alignment with one another.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

We claim:

1. A torque converter assembly, comprising:
    a turbine assembly;
    a pump assembly; and
    a clutch assembly that selectively rotationally couples the turbine assembly to the pump assembly, the clutch assembly further comprising:
        at least one clutch disk; and
        a backing plate having at least one finger defined therefrom, the at least one finger rotationally coupled to the at least one clutch disk.

2. The torque converter assembly of claim 1, further wherein when the clutch assembly is in an engaged orientation, the pump assembly is mechanically coupled to the turbine assembly and when the clutch assembly is not in the engaged orientation, the pump assembly is not mechanically coupled to the turbine assembly.

3. The torque converter assembly of claim 1, further wherein the at least one finger is formed from a bend in the backing plate.

4. The torque converter assembly of claim 1, further comprising a damper assembly, wherein the clutch assembly selectively transmits torsional loads between the backing plate and the damper assembly.

5. The torque converter assembly of claim 1, further comprising a piston that applies axial pressure to the clutch assembly when the clutch assembly is in an engaged position.

6. The torque converter assembly of claim 5, wherein the piston is rotatable independently from the pump assembly.

7. The torque converter assembly of claim 1, further wherein the backing plate is composed of a first plate and a second plate coupled to one another.

8. The torque converter assembly of claim 7, further wherein the backing plate defines an axis and a backing plate surface, wherein the first plate and the second plate are coupled to one another at a location axially offset along the axis from the backing plate surface.

9. The torque converter assembly of claim 8, further wherein the first plate and the second plate each define at least one bend.

10. The torque converter assembly of claim 1, wherein the backing plate has a radially outer edge that terminates at a lip, the lip being a substantially 90 degree bend.

11. A torque converter backing plate assembly for a lockup clutch, comprising:
    a first plate and a second plate coupled to each other; and
    at least one finger integrally formed as part of the second plate and extending from the backing plate assembly;
    wherein, the at least one finger engages a portion of a clutch assembly;
    further wherein, the backing plate assembly provides axial resistance to the clutch assembly and transfers torsional forces from the backing plate assembly to the clutch assembly.

12. The backing plate assembly of claim 11, wherein the at least one finger is a 90 degree bend of a portion of the second plate.

13. The backing plate assembly of claim 11, further comprising an outer lip along the outermost radial edge of the backing plate assembly, wherein the outer lip is a substantially 90 degree bend of the second plate.

14. The backing plate assembly of claim 11, wherein the first plate and the second plate are coupled to each other at a first radius and a second radius.

15. The backing plate assembly of claim 14, further wherein the second radius is substantially adjacent to a backing plate surface.

16. A torque converter with a lockup clutch, comprising:
    a front cover extending from a front cover hub and coupled to a rear cover;
    a pump assembly coupled to the rear cover;
    a turbine assembly coupled to a turbine hub;
    a backing plate assembly coupled to the front cover hub and defining backing plate clutch fingers integrally formed from the backing plate assembly;
    a clutch assembly coupled between the backing plate assembly and the turbine hub; and
    a piston disposed in the front cover;
    wherein, the backing plate clutch fingers engage a first portion of the clutch assembly.

17. The torque converter of claim 16, further comprising a damper coupled to the turbine hub and defining damper clutch fingers, wherein the damper clutch fingers engage a second portion of the clutch assembly.

18. The torque converter of claim 16, wherein the first portion of the clutch assembly comprises at least one clutch plate.

19. The torque converter of claim 17, wherein the second portion of the clutch assembly is at least one reaction plate.

20. The torque converter of claim 16, wherein the piston can be selectively actuated by supplying pressurized fluid through a fluid passage in the front cover hub.

* * * * *